US008615461B2

(12) United States Patent
MacPherson

(10) Patent No.: US 8,615,461 B2
(45) Date of Patent: *Dec. 24, 2013

(54) SYSTEM AND METHODS FOR PROCESSING OPEN-END MUTUAL FUND PURCHASE AND REDEMPTION ORDERS AT CENTRALIZED SECURITIES EXCHANGES AND OTHER SECURITIES TRADING AND PROCESSING PLATFORMS

(76) Inventor: James MacPherson, Greenwich, CT (US)

(*) Notice: Subject to any disclaimer, the term of this patent is extended or adjusted under 35 U.S.C. 154(b) by 57 days.

This patent is subject to a terminal disclaimer.

(21) Appl. No.: 12/590,415

(22) Filed: Nov. 6, 2009

(65) Prior Publication Data

US 2010/0057608 A1    Mar. 4, 2010

Related U.S. Application Data

(63) Continuation-in-part of application No. 09/716,189, filed on Nov. 17, 2000, now Pat. No. 7,636,682.

(60) Provisional application No. 60/166,558, filed on Nov. 19, 1999.

(51) Int. Cl.
*G06Q 40/00* (2012.01)

(52) U.S. Cl.
USPC .................. 705/37; 705/35; 705/36 R; 705/38

(58) Field of Classification Search
USPC ............................................ 705/35–39, 38 R
See application file for complete search history.

(56) References Cited

U.S. PATENT DOCUMENTS

| | | | |
|---|---|---|---|
| 5,262,942 A * | 11/1993 | Earle | 705/37 |
| 5,517,406 A * | 5/1996 | Harris et al. | 705/30 |
| 5,864,827 A | 1/1999 | Wilson | |
| 5,949,044 A | 9/1999 | Walker et al. | |
| 6,021,397 A * | 2/2000 | Jones et al. | 705/36 R |
| 6,029,146 A * | 2/2000 | Hawkins et al. | 705/35 |
| 6,148,293 A | 11/2000 | King | |
| 6,236,972 B1 * | 5/2001 | Shkedy | 705/26.1 |
| 6,247,000 B1 | 6/2001 | Hawkins et al. | |
| 6,267,292 B1 | 7/2001 | Walker et al. | |
| 6,418,419 B1 | 7/2002 | Nieboer et al. | |
| 2001/0042785 A1 * | 11/2001 | Walker et al. | 235/379 |
| 2004/0117302 A1 * | 6/2004 | Weichert et al. | 705/40 |

OTHER PUBLICATIONS

From Albany.: Caucus of the Maine Law Party. Composition of . . . Special Dispatch to New-York Daily Times. New York Daily Times (1851-1857); Jan 5, 1854;, ProQuest Historical Newspapers: The New York Times (1851-2009) p. 8.*
Distribution of Mutual Fund 1099s improved; more changes considered Thomas Sutter. ABA Trust & Investments. Washington: May/Jun. 1999. vol. 69 p. 40, 2 pgs.

* cited by examiner

*Primary Examiner* — Hani M Kazimi
*Assistant Examiner* — Clement B Graham
(74) *Attorney, Agent, or Firm* — Abelman, Frayne & Schwab

(57) ABSTRACT

A system for processing traditional open-end mutual fund purchase and redemption orders at a server at designated Exchange(s) for receiving order messages from at least one of a plurality of Brokers and Member Firms, the server having at least one processor and memory for storing routines operable to process individual or aggregated order messages, preferably based on a prioritized set of business rules, and/or match the purchase and redemption orders, reformat the orders, and transmit the reformatted orders to at least one of a plurality of Fund/Securities Clearing Agents, Funds/Transfer Agents and Depositaries for confirmation, and clearing and settlement of issuance and redemption orders for mutual fund shares, as well as payment of mutual fund dividends.

23 Claims, 12 Drawing Sheets

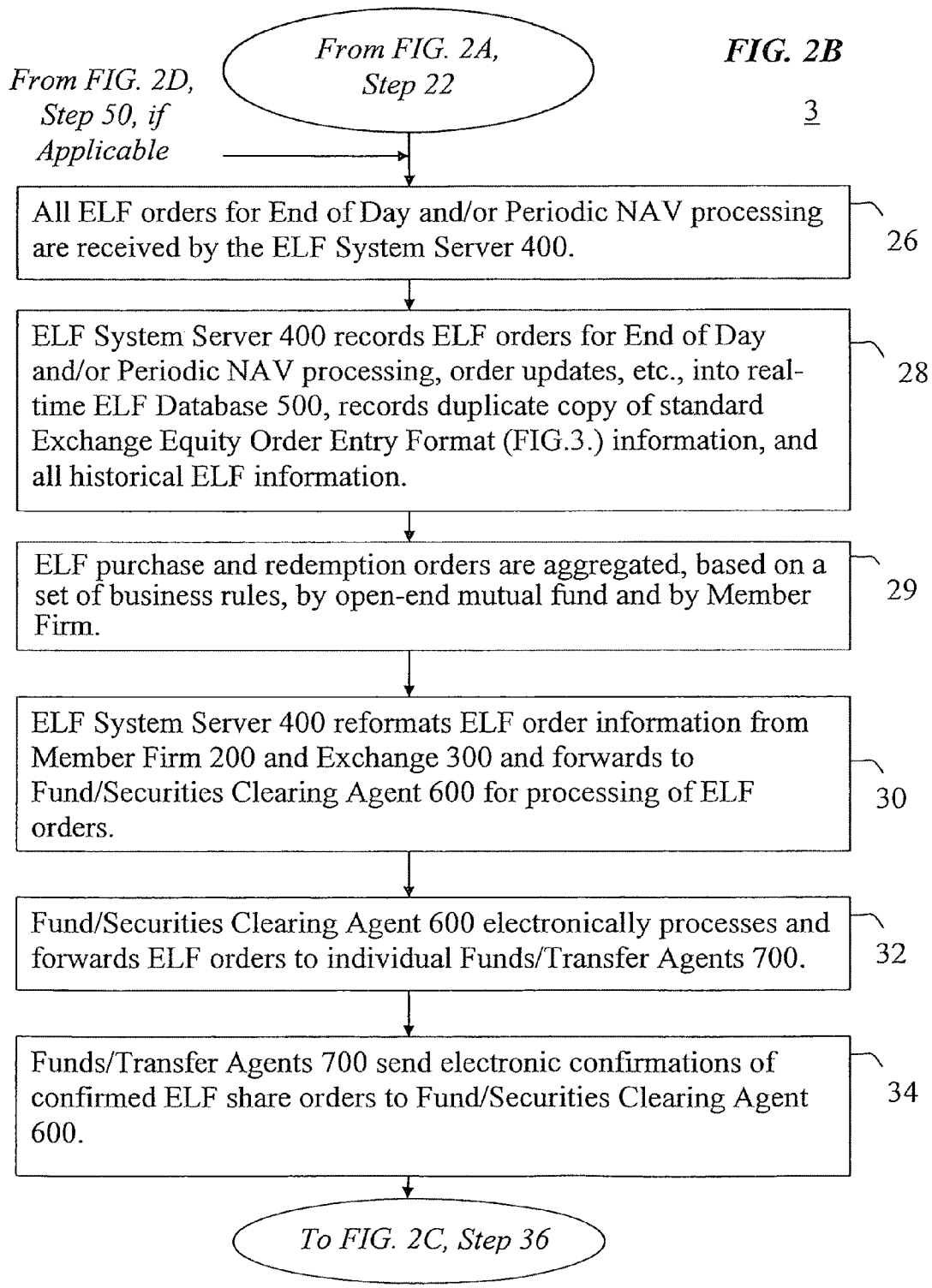

FIG. 3

*Equity Order Entry Format*

| LINE # / MAX CHARACTERS | ENTRY | | | | | |
|---|---|---|---|---|---|---|
| 0 / 32 | SHARED INTERFACE FIRM IDENTIFIER | | | | | |
| 1 / 32 | BRANCH CODE | | SEQUENCE NUMBER | | | |
| 1A / 32 | EXCHANGE | ROUTING CODE | COMP SPEC | | | BOOTH ID |
| 2 / 32 | POSS DUPLICATE | CANCEL | BUY    SL    SSHRT<br>BUY MINUS    SL PLUS    SSHRT EXEMPT | | | |
| 3 / 74 | QUANTITY | STOCK SYM | SUFFIX | | | PRICE |
| 3A / 32 | ALL OR NONE | TIME IN FORCE | DO NOT REDUCE/ INCREASE | DELIVERY INSTRUCTION | TRY TO STOP | ACCOUNT TYPE |
| 3B / 32 | CXL | PRICE FOR PRICE CHANGE ONLY | BUY    SL    SSHRT<br>BUY MINUS    SL PLUS    SSHRT EXEMPT | | | |
| 3C / 74 | QUANTITY | STOCK SYM | SUFFIX | PRICE<br>MKT | CLD    OB    STP<br>BAS    WOW | LMT |
| 3D / 32 | ALL OR NONE | TIME IN FORCE | DO NOT REDUCE/ INCREASE | DELIVERY INSTRUCTION | TRY TO STOP | ACCOUNT TYPE |
| 3E / 32 | LEAVES | | TIME-IN-FORCE (SAME AS LINE 3A) | | | |
| 3F / 32 | CURRENTLY NOT USED | | | | | |
| 4 / 32 | MISCELLANEOUS INFORMATION | | | | | |
| 4A / 32 | REFERENCE DATA | | MISCELLANEOUS INFORMATION | | | |
| 4B / 74 | GIVE UP DATA | | CONFIRMATION DATA | | | |
| TRAILER LINE | MEMBER FIRM'S CUSTOMER INFORMATION | | | | | |

FIG. 4A, Fund Order Entry Form

| Field Name | Start | End | Len | Type | Description | Opt/Req | Reject Code |
|---|---|---|---|---|---|---|---|
| Physical Sequence Number | 1 | 2 | 2 | A/N | | R | 004 |
| Logical Sequence Number | 3 | 4 | 2 | A/N | 01 | R | 004 |
| Originator Type | 5 | 5 | 1 | A/N | B = Firm<br>T = TPA | R | 187 |
| Filler | 6 | 7 | 2 | A/N | Space | R | |
| Firm Number | 8 | 11 | 4 | N | | R | 008 |
| Firm Suffix | 12 | 14 | 3 | A/N | See Fund/SERV manual | O | 154 |
| Record Type | 15 | 17 | 3 | A/N | 001 = Order | R | 002 |
| Test Indicator | 18 | 18 | 1 | A/N | 0 = Production<br>1 = Test | R | 122 |
| Priority Indicator | 19 | 19 | 1 | A/N | 0 = Normal<br>1 = High priority | O | 151 |
| Fund Number | 20 | 23 | 4 | N | | O | 100 |
| Fund Suffix | 24 | 26 | 3 | A/N | See Fund/SERV manual | O | 155 |
| Security Issue Country Code | 27 | 28 | 2 | A/N | Space. For future use | R | |
| Security Issue ID | 29 | 37 | 9 | A/N | | R | 007 |
| Security Issue Check Digit | 38 | 38 | 1 | A/N | Space. For future use | R | |
| Security Issue Type | 39 | 40 | 2 | A/N | 24 = Money Market<br>25 = Load Fund<br>26 = No Load Fund | R | 150 |
| Control Number | 41 | 55 | 15 | A/N | | R | 005 |
| Correction Indicator | 56 | 56 | 1 | A/N | Space | R | 006 |
| Transaction Type | 57 | 57 | 1 | A/N | 0 = Single purchase<br>1 = Letter of intent<br>2 = Rights of accumulation<br>3 = Net asset value<br>4 = Group purchase | R | 017 |

FIG. 4B, Fund Order Entry Form

| | | | | | | |
|---|---|---|---|---|---|---|
| Transaction Code | 58 | 59 | 2 | A/N | 5 = CDSC liquidation<br>01 = Initial purchase<br>02 = Subsequent purchase<br>03 = Partial liquidation<br>04 = Full liquidation<br>Must be 03 or 04 if Transaction Type = 5 | R | 018 |
| Submission Date (+) | 60 | 67 | 8 | N | mmddccyy | R | 101 |
| Trade Date (+) | 68 | 75 | 8 | N | mmddccyy | R | 016 |
| Book/Physical Share Indicator | 76 | 76 | 1 | A/N | 0 = Book shares - firm name<br>1 = Book shares - customer name<br>2 = Physical shares<br>3 = Both book and physical shares<br>Must be 0 or 1 for Money Market trades | R | 015 |
| PI Delivery Indicator | 77 | 77 | 1 | A/N | Required for all purchases if Book/Physical Share Ind = 2.<br>0 = Deliver to customer<br>1 = Deliver to firm<br>2 = Deliver to agent for firm | OC | 039 |
| Filler | 78 | 78 | 1 | A/N | Space | R | |
| Settlement Override Reason Code | 79 | 80 | 2 | A/N | Required if Anticipated Settlement Date is provided.<br>01 = Wrap fee account<br>02 = 401K<br>03 = Other | OC | 179 |
| NSCC Rejection Indicator | 81 | 81 | 1 | A/N | Input: Space<br>Output:<br>0 = Accepted by NSCC<br>1 = Rejected by NSCC<br>2 = Rejected by NSCC, multiple errors | R | |

Buying and Selling (trading) of Shares of Traditional Exchange Listed Stock Companies

Stock buy and sell order example

In contrast to purchases and redemptions of shares of open-end mutual funds, per FIG. 5A, buy and sell orders for existing shares of stock of publicly traded (exchange listed) stock companies are traded between brokers, by being matched, traditionally at an exchange.

The public company is not involved in the buy or sell transaction, rather, the broker completes the transaction on the exchange for the investor.

Traditional Exchange listed companies have a fixed number of outstanding shares which does not increase due to buy and sell orders.

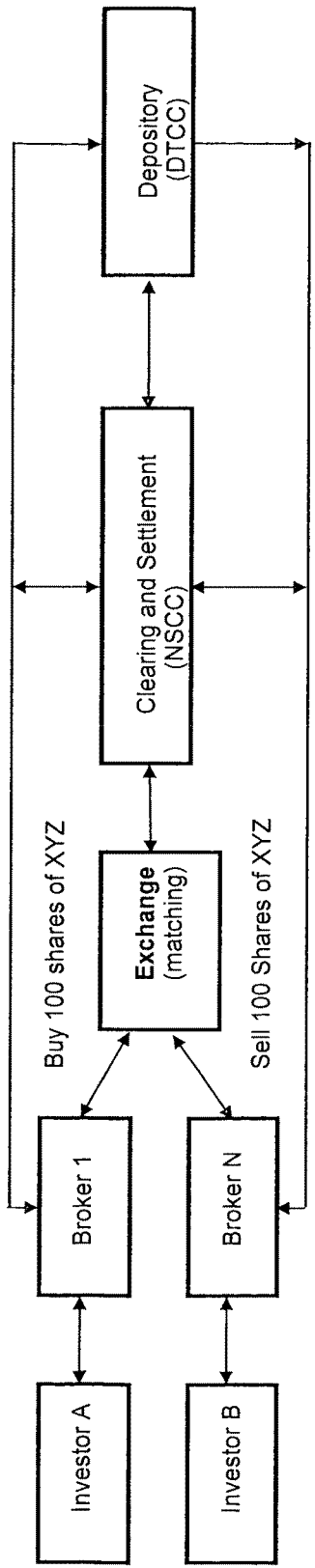

FIG. 5B (PRIOR ART)

Priority of Action Business Rules
(with illustrative examples)

Mutual Fund/ELF symbol [ABCDX]

Member Firm ID# [MF123]

The following illustrative ELF System Server 400 Priority of Action Business Rules, outlined in sample table below, determine each time purchase and redemption orders are to be routed from Exchange 300 by ELF System Server 400 to Fund/Securities Clearing Agent 600.

| PRIORITY OF ACTION | | BUSINESS RULES |
|---|---|---|
| 5 | a | Every [30] minutes. |
| 2 | b | When [100] orders are received. |
| 1 | c | Purchase or redemption orders of $ [150,000] or more are received. |
| 3 | d | Gross purchase and redemption orders of $ [100,000] or more are received. |
| 6 | e | Orders to purchase or redeem [15,000] or more shares are received. |
| 4 | f | Gross purchase and redemption orders of [10,000] or more shares are received. |
| 7 | g | End of trading day. |

FIG.6

SYSTEM AND METHODS FOR PROCESSING OPEN-END MUTUAL FUND PURCHASE AND REDEMPTION ORDERS AT CENTRALIZED SECURITIES EXCHANGES AND OTHER SECURITIES TRADING AND PROCESSING PLATFORMS

CROSS-REFERENCE TO RELATED APPLICATIONS

This application is a continuation-in-part application of U.S. application Ser. No. 09/716,189, filed Nov. 17, 2000 now U.S. Pat. No. 7,636,682 which claims priority from U.S. Provisional Application No. 60/166,558, filed Nov. 19, 1999, the disclosures of which are incorporated by reference herein in their entireties.

FIELD OF THE INVENTION

The present invention relates to a system and computer implemented methods for the purchase (buying) and redemption (selling) of shares of open-end investment companies. More specifically, the present invention relates to placing orders for the purchase and redemption of shares of any participating open-end mutual fund by any customer of any Member Firm of a Securities Exchange (or Market Participant of a Securities Market), or ordering participants of an Electronic Communications Network ("ECN") or alternative trading system ("ATS") ELF market (collectively, "Member Firms") for end of the day, periodic, and/or continuous (real-time) processing, clearing and settlement at the fund's Net Asset Value ("NAV"), or clearing price, via a centralized securities Exchange or other such securities trading and/or processing platform with connectivity to participating brokerage firms and Member Firms.

BACKGROUND OF THE INVENTION

Traditional actively-managed open-end mutual funds and non-exchange-traded index mutual funds (e.g., those funds registered under the Investment Company Act of 1940) are not "listed" with (and therefore their purchase and redemption orders are not processed on) traditional Securities Exchanges or traditional Securities Markets. Nor are such open-end mutual funds and non-exchange-traded index mutual funds available on electronic communications networks ("ECNs") or alternative trading systems ("ATS") having connectivity with their respective Member Firms or participating brokers for end of day, periodic or continuous processing. These mutual funds are currently not Securities Exchange "listed" because (i) Securities Exchanges and other related trading platforms have traditionally been markets for the intra-day price discovery of traditional "listed" securities among their Member Firms, their Member Firms' customers, and participating brokers; (ii) listed securities (e.g., of stock companies, closed-end funds, special purpose acquisition companies ("SPAC"), structured products and the like), other than exchange traded index funds ("ETF"), have a finite number of shares which are bought and sold on Securities Exchanges or other trading platforms (by comparison, traditional open-end mutual funds, via prospectus, continuously offer their shares for payment via purchases by investors, and continuously redeem their shares for payment to investors); and (iii) traditional mutual funds, whether 'load' or 'no-load' funds, are purchased or redeemed after the calculation of the fund's net asset value ("NAV"), which is usually computed at the end of the trading day.

Net Asset Value (NAV) per share of a mutual fund represents the total assets owned by the fund, less the total liabilities, divided by the number of fund shares outstanding. The value of a share of a traditional open-end mutual fund is not determined by offering and bidding for the fund, as which occurs for typical Securities Exchange listed stocks, closed-end funds, etc., on the Exchanges. In practice, investors can invest in mutual funds by dollar amount (and may receive fractional shares) or in a stated number of shares. Fund share prices are traditionally calculated at end-of-day on the basis of the NAV of the fund shares after the fund's daily securities transactions have been applied to the fund's portfolio. A typical fund purchase or redemption transaction occurs after calculation of NAV.

Funds (as registered under the Investment Company Act of 1940) can generally be categorized as closed-end funds and open-end (mutual) funds. Closed-end funds have a fixed number of issued and outstanding shares that can be traded between two parties on a Securities Exchange on which the fund is listed, as well as on other trading platforms. For example, a closed-end fund can include 100,000,000 issued and outstanding shares and be listed for trading on the NY Stock Exchange. The 100,000,000 shares is a fixed number and does not increase or decrease based on executed "buy" or "sell" orders of the closed-end fund by investors.

By comparison, an open-end mutual fund has a variable amount of shares that changes based on the aggregate amount of purchases and redemptions of fund shares over a predetermined period (e.g., daily, which is a traditional order and settlement time period). Traditional open-end mutual funds are not listed on any U.S. Securities Exchange, and thus do not trade on any U.S. Securities Exchange. Rather, an investor can purchase or redeem a quantity of fund shares directly through the mutual fund or via a Broker who has a contractual arrangement with the mutual fund to be able to purchase and redeem shares on behalf of investors. An example of a popular open-end mutual fund is the Fidelity Magellan ("Magellan") Fund (ticker "FMAGX") which is one of a family of funds issued by the investment firm Fidelity Investments of Boston, Mass. There are thousands of other open-end mutual funds that investors can purchase and redeem according to their investment preferences. All of the open-end mutual funds buy and sell underlying securities, such as stocks, bonds and other securities for their funds' portfolios for the benefit of their investors.

Referring to FIG. 5A, a prior art block diagram illustrating the difference between "purchase" and "redemption" orders of open-end mutual funds versus, referring to FIG. 5B, "buy" and "sell" orders of other types of securities other than ETFs, such as stocks and closed-end funds which are traded on a centralized Securities Exchange is shown. Specifically, traditional open-end mutual funds are either purchased or redeemed by the investors directly with the mutual fund, or via intermediaries (e.g., brokers) who act on the behalf of the investors. The open-end mutual fund is involved in each separate purchase and redemption transaction. The total amount of outstanding shares of open-end mutual funds can increase (via purchase transactions) or decrease (due to redemption transactions) each day.

The number of shares of an open-end mutual fund is variable based on the aggregate number of shares purchased and redeemed each day. By way of example in FIG. 5A, suppose the open-end Magellan Fund (i.e., ticker FMAGX) currently has 100,000,000 issued shares and a NAV per share of $25.00. If a new investor were to place a purchase order with the Magellan Fund for 40 shares of, or for $1,000.00 of the Magellan Fund, once the order is transacted, the investor would receive 40 shares (1,000/25) of the Magellan Fund, and the total number of issued shares of the Magellan Fund would increase by forty shares, to 100,000,040 shares. If the investor instead redeemed $1,000.00, then the total number of issued shares of the Magellan Fund would decrease by forty shares, to 99,999,960 shares. The same principle applies for all investors who purchase and redeem shares of any open-end mutual fund, in which an aggregate number of shares that are purchased and redeemed by all the investors is computed at the end of each business day to determine the total number of shares of the fund. Accordingly, it follows that (i) traditional open-end mutual funds do not have a fixed number of shares, such as stocks and other non-ETF Securities Exchange listed and "traded" securities; (ii) those open-end mutual funds do not trade on a centralized Securities Exchange or other trading platform, such as stocks are traded; and (iii) the purchase and redemption of the mutual funds are independent of one and another (i.e., the purchase and redemption of shares does not depend on the matching of shares between parties (i.e., trading of shares as between shareholders)).

Referring to the prior art block diagram of FIG. 5B, by contrast, "buy" and "sell" orders (i.e., trading orders) for existing shares of stock of publicly listed companies are traded by brokers, by being matched, usually at a Securities Exchange (e.g., NY Stock Exchange, NASDAQ Exchange and the like) or other trading platform. A publicly listed and traded company is not involved in the buy and sell transactions of its stock. Moreover, publicly traded companies, other than ETFs, have a fixed number of outstanding shares which do not increase or decrease due to buy and sell orders, respectively. As shown in FIG. 5B, 100 shares of a stock illustratively having a ticker XYZ can only be bought by an investor when the Securities Exchange, or other trading platform, matches the buy order of 100 shares of XYZ with an XYZ sell order of another investor. Thus, the transaction of one investor is dependent on the availability from another investor. Moreover, the total number of issued XYZ shares does not increase or decrease due to the buying and/or selling of such shares.

Once the purchase and redemption of mutual fund shares occurs, the majority of mutual fund share orders and monies due are cleared and settled through a Fund/Securities Clearing Agent. For example, one such Fund/Securities Clearing Agent is Fund/SERV, services offered by the National Securities Clearing Corporation ("NSCC"), which is currently a subsidiary of the Depository Trust and Clearing Corporation ("DTCC").

Although specific brokerage firms provide their customers with daily purchase and redemption processing services for mutual fund shares through their own "fund supermarkets" and/or their proprietary fund distribution systems, there are various shortcomings with such services. Such firms generally allow only selected funds into their distribution systems and offer either (i) 'load' funds, or (ii) 'no-load' funds with either 'no transaction fees' or 'transaction fees' to their customers. Fund supermarkets that offer 'no transaction fee' funds to investors generally charge those mutual funds and/or their investment advisers/distributors annual asset-based fees of up to 40 basis points (e.g., 0.0040 bps×$1,000 of assets=$4.00 per year). Often, all or a portion of these fees are deducted from a fund's NAV, thereby resulting in lower investment returns for investors than might otherwise be the case. Fund supermarkets that offer 'transaction fee' funds generally charge investors higher fees to purchase or redeem 'no-load' mutual fund shares than to make regular stock trades. Sales 'loads' and 'transaction fees,' and other fees for 'no transaction fee' funds which are charged by brokers, can also cost investors a relatively significant percentage of their fund purchases, and thereby diminish their total investment returns in such funds.

Thus, there is a need for a centralized system and method that increases mutual fund distribution among more investors, more funds, more Member Firms and other industry participants. There is also a need for a system and method that reduces fund expenses and lowers distribution costs for funds, their investment advisors/distributors and investors. Additionally, there is a need for a system and method that increases investor returns in open-end mutual funds. Further, there is also a need for an efficient system and method to aggregate mutual fund orders by setting and prioritizing business rules for such aggregation.

SUMMARY OF THE INVENTION

It is an object of this invention to overcome at least the aforementioned disadvantages of the prior art by creating a more open, centralized, uniform and efficient system for mutual fund distribution which is available to all investors, all funds, all Member Firms and other industry participants. The system and method of the present invention enables any customer of any Member Firm of any Securities Exchange, Securities Market, electronic communications network ("ECN"), alternative trading system ("ATS") or exchange listed fund ("ELF") market (collectively, "Exchange") or any Member Firm to place purchase or redemption order(s) for Exchange listed, hosted and/or processed (collectively, "listed") mutual fund ("ELF"), shares, at any time such Member Firm or Exchange allows placing of such orders for end-of-day, or periodic settlement at NAV, or continuous processing (at clearing price).

It is another object of this invention to provide a system with connectivity among all investors, all funds, all Member Firms, participating Exchanges and other industry participants, such that any investor can purchase or redeem any ELF share, through any Member Firm of which the investor is a customer at any time the Member Firm and Exchange allows placement of such orders.

It is another object of the present invention to implement a system that provides the mutual fund industry with a standard and uniform distribution and compensation system that can lower the annual fees charged to participating funds, their advisers/distributors and their investors by Member Firms, and that can lower investors' fund transaction fees to levels at or below their Member Firms' standard stock commissions.

It is a further object of the present invention to provide a more efficient system and method to aggregate mutual fund orders by setting and prioritizing business rules for such aggregation. Funds that are eligible to participate in the system of the present invention include all open-end funds registered under the Investment Company Act of 1940 with assigned securities symbols (e.g., those 5 character symbols with suffix 'X' which may be assigned to funds by the National Association of Securities Dealers Automated Quotation ("Nasdaq")), or other symbols assigned by other assignment entities (e.g., Exchanges), representing such Exchange (and Market) listed and/or hosted and/or processed fund (ELF) shares.

In one embodiment, there is provided a computer implemented method for processing traditional open-end mutual fund order messages at a designated securities Exchange, including purchase and redemption orders of shares of an open-end mutual fund, the open-end mutual fund being listed or hosted at the exchange for processing, and having a total number of currently issued shares which is variable as a function of periodic adjustments for newly purchased shares and redeemed shares. The method includes the steps of receiving, from Member Firms, order messages associated with purchase and/or redemption orders for shares of the open-end mutual fund listed or hosted on the Exchange in Exchange Equity Order Entry Format at at least one of a plurality of first servers communicably connected to the designated Exchange; processing, by Member Firm, the received purchase and redemption order messages for the open-end mutual fund shares as individual orders or as an aggregation of multiple orders; reformatting the individual or aggregated orders to Fund Order Entry Format at the at least one first server; and transmitting the reformatted order messages from the at least one first server to at least one of a plurality of second servers at Fund/Securities Clearing Agents for confirmation, clearing and settlement including issuance and redemption of the open-end mutual fund shares by the open-end mutual fund. It is noted that the orders can be aggregated by netting the orders by fund and by each Member Firm according to a set of prioritized business rules, where such aggregation is provided to lower ordering processing costs by minimizing the individual number of orders to be processed, and maximizing computer utility.

In one aspect, the step of transmitting further comprises the step of forwarding the reformatted orders from the at least one second server to at least one third server of at least one individual Funds/Transfer Agents for processing and confirmation. The step of transmitting can include sending the reformatted orders periodically from the at least one first server as single, batch and/or multi-batch messages. Alternatively, the step of forwarding comprises transmitting the reformatted orders throughout the business day from the at least one first server, as single, batch and/or multi-batch messages.

In another aspect, the method further includes the step of receiving confirmation messages at the at least one first server from at least one of the second servers at the Funds/Securities Clearing Agents. The confirmation messages can be received at the at least one first server periodically and at the end of the day. In yet another aspect, the method further comprises the step of reformatting the confirmation messages at the at least one first server and transmitting the confirmation messages from the at least one first server to servers at at least one of a plurality of ordering Member Firms. Alternatively, the aggregated confirmation messages can be parsed prior to the reformatting of the confirmation messages. In an aspect of the embodiment, the step of transmitting the confirmation messages further comprises the step of transmitting the confirmation messages from the at least one first server throughout the day as single, batch and/or multi-batch messages.

In still another aspect, the step of processing the orders includes applying a set of business rules to the orders. The business rules can include processing orders by fund and by Member Firm based on when new purchase or redemption orders of a predetermine amount are received, processing orders when a predetermined number of orders are received, processing orders when gross purchase and redemption orders of a predetermined amount are received, processing orders when gross purchase and redemption orders of a predetermined number of shares are received, at a predetermined time interval, processing orders when gross orders to purchase or redeem a predetermined amount of shares are received, and processing orders at end of day. In another aspect, the set of business rules are prioritized to determine hierarchy and timing for processing the orders.

In still another aspect, the step of clearing and settlement of order messages includes processing the issuance and redemption of mutual fund shares by the mutual fund through the second servers at at least one of the Fund/Securities Clearing Agents and third server at Fund/Transfer Agent using at least one Fund/Securities Clearing Agent money settlement system.

In yet another aspect of the present embodiment, the method further includes the step of paying at least one of cash dividends and reinvested dividends to at least one of a Member Firm's to at least one of a Member Firm's Depository Account and at least one of Member Firm's Fund/Securities Clearing Agent's Account for money settlement.

In another aspect, the method includes receiving the order messages at the server for tabulation. The order messages can then be stored in a database. Moreover, order messages in the database can be stored by dates, Member Firms and mutual funds, including gross purchase and redemption and historical orders, dividends, and net fund positions. In one aspect, the method includes the step of receiving dividend information at the at least one first server for tabulation of correct calculation of each fund's NAV, fund total returns over different time periods, and each fund's assets held at each Member Firm of each securities Exchange.

In yet another aspect, NAV and total return information can be stored in the database including dividends and fund assets held at each Member Firm at different points in time. In still yet another aspect, the method includes sorting orders, performing calculations relating to orders at the at least one first server, including the steps of tabulating orders into records and generating reports.

In another embodiment of the present invention, a computer implemented method for continuously processing traditional open-end mutual fund order messages, including purchase and redemption transactions, of a plurality of open-end mutual funds listed at a securities Exchange, each open-end mutual fund having a total number of currently issued shares which is variable as a function of periodic adjustments for newly purchased shares and redeemed shares is provided. The method comprises the steps of receiving purchase and redemption orders in Exchange Equity Order Entry Format at a first server of an Exchange from a second server at at least one Member Firm; matching and executing the orders for each open-end mutual fund by Member Firm at the first server of the Exchange, each the open-end mutual fund being listed on the Exchange as Exchange listed open-end mutual fund; reformatting the matched and executed orders to Fund Order Entry Format at the first server; transmitting the reformatted orders to servers at at least one of a plurality of Fund/Securities Clearing Agents for clearing and settlement, and transmitting the matched and executed orders from the first server of the Exchange to servers at at least one of a plurality of ordering Member Firms for confirmation.

In one aspect of the embodiment, the step of transmitting the reformatted orders from the first server comprises forwarding the orders continuously in real-time to servers at the at least one of a plurality of Fund/Securities Clearing Agents, Funds/transfer Agents and Depositaries. In another aspect, the matched and executed order messages are tabulated.

In yet another embodiment of the present invention, a computer implemented system for processing traditional open-end mutual fund order messages at a designated securities Exchange, including purchase and redemption orders of shares of an open-end mutual fund, the open-end mutual fund being listed or hosted at the exchange for processing, and having a total number of currently issued shares which is variable as a function of periodic adjustments for newly purchased shares and redeemed shares is provided. The system comprises a first server communicably coupled to the Exchange and operable to: receive, from Member Firms, order messages associated with purchase and/or redemption orders for open-end mutual fund shares in Exchange Equity Order Entry Format; process, by Member Firm, the received purchase and redemption order messages for the open-end mutual fund shares as individual orders or as an aggregation of multiple orders; reformat the individual or aggregated orders to Fund Order Entry Format at the at least one first server; and transmit the reformatted order messages from the at least one first server to at least one of a plurality of second servers at Fund/Securities Clearing Agents for confirmation, clearing, and settlement including issuance and redemption of the open-end mutual fund shares by the open-end mutual fund. It is noted that the orders can be aggregated by netting the orders by fund and by each Member Firm according to a set of prioritized business rules, where such aggregation is provided to lower ordering processing costs by minimizing the individual number of orders to be processed, and maximizing computer utility.

In one aspect, the reformatted order messages are forwarded from the at least one second server to at least one third server of at least one individual Funds/Transfer Agents for processing and confirmation. In another aspect, the reformatted order messages are sent from the at least one second server throughout the day, as single, batch and/or multi-batch messages. In yet another aspect, the reformatted order messages are sent periodically from the at least one first server as single, batch and/or multi-batch messages.

In another aspect of the present embodiment, the step of processing includes applying a set of business rules to the orders. In one aspect, the set of business rules includes processing orders per fund per Member Firm based on when new purchase or redemption orders of a predetermine amount are received, and processing orders when a predetermined number of orders are received. In another aspect, the set of business rules comprises processing orders per fund per Member Firm based on when gross purchase and redemption orders of a predetermined amount are received, and processing orders when gross purchase and redemption orders of a predetermined number of shares are received. In still another aspect, the set of business rules comprises processing orders per fund per Member Firm based on a predetermined time interval, processing orders when gross orders to purchase or redeem a predetermined amount of shares are received, and processing orders at end of day. In a further aspect, the set of business rules are prioritized to determine hierarchy and timing for processing the orders.

BRIEF DESCRIPTION OF THE DRAWINGS

The accompanying drawings, which are incorporated in and constitute a part of the specifications, illustrate preferred embodiments of the invention and, together with the general description of the preferred embodiments given below, serve to explain the operation of the invention. It should be understood that the invention is not limited to the embodiments disclosed as examples, and is capable of variation within the scope of the appended claims. In the drawings.

FIGS. 2B and 2C is a flow diagram of a method for end of day and periodic NAV processing of ELF purchase and redemption orders using the system of FIG. 1;

FIG. 3 depicts a table of a prior art Exchange Equity Order Entry Form;

FIGS. 4A and 4B depict a partial table of a prior art of a Fund Order Entry Form;

FIGS. 5A and 5B are prior art block diagrams illustrating purchase and redemption of shares of open-end mutual funds directly from the mutual fund versus buying and selling shares of traditional exchange listed companies; and FIG. 6 depicts a table illustrating Prioritization of Business Rules for the ELF order processing system.

DETAILED DESCRIPTION OF THE INVENTION

For purposes of understanding the present invention, "Exchange" is defined as any Securities Exchange, Securities Market, electronic communications network ("ECN"), alternative trading system ("ATS") or exchange listed fund ("ELF") market or other such securities trading and/or processing platform with connectivity to participating brokerage firms and Member Firms.

Further, the term "Exchange Listed Fund" (ELF) includes listed, hosted and otherwise open-end mutual funds, the securities of which are available for "processing" at an Exchange (s), (where the term "listing" traditionally applies to those companies or other entities that register their securities with the Securities and Exchange Commission, and which are available for trading on a Securities Exchange), while the term "hosting" refers to those open-end mutual funds which may not be listed, in a technical sense, but never-the-less, are also available for purchases and redemptions (i.e., processing) at and via an Exchange.

Figure 1:
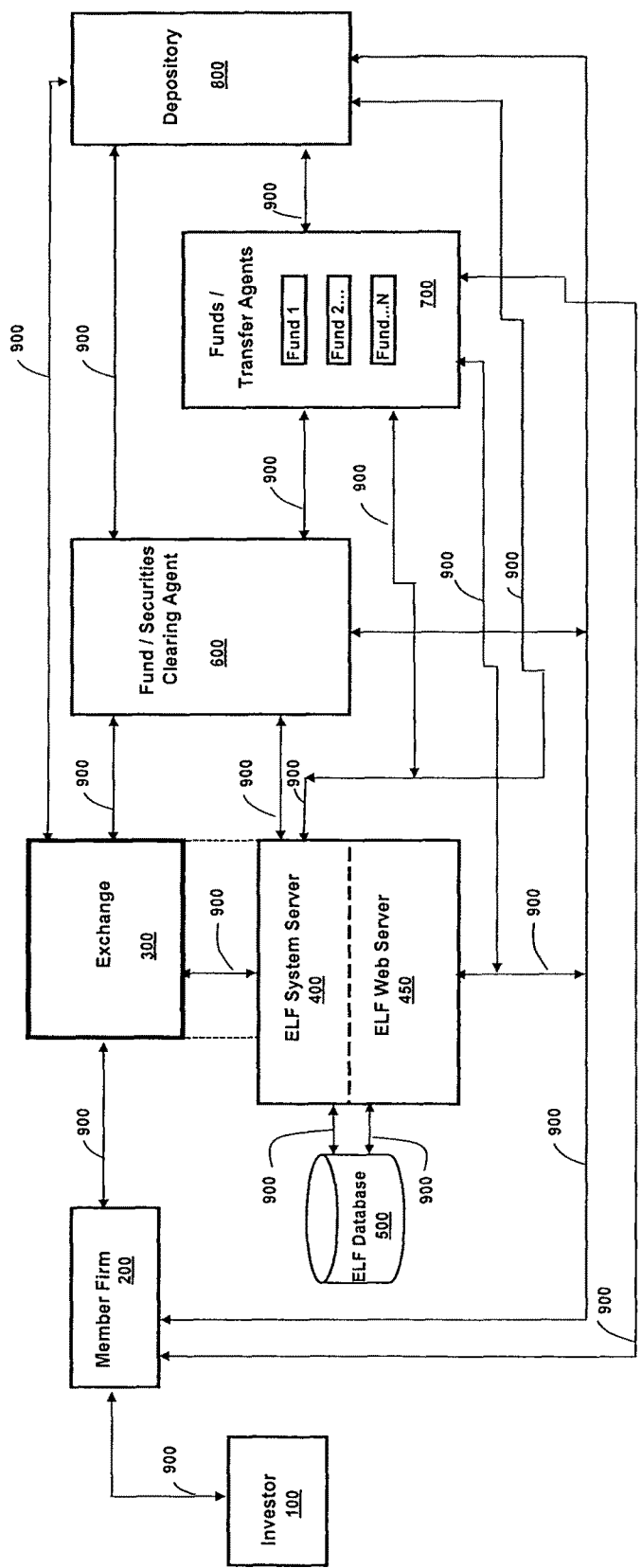
FIG. 1 is a block diagram of a system for processing Exchange hosted, processed and/or listed fund (ELF) purchase and redemption orders in accordance with the invention.

Referring to FIG. 1, a system 1 for processing Exchange hosted, processed or otherwise listed fund (hereinafter "ELF") purchase and redemption orders is illustratively shown. Any Investor 100 (i.e., person or other entity) using the System 1 can place orders to purchase or redeem ELF shares through one or more Exchange(s) 300 via any registered broker of, or directly by, an Exchange Member Firm 200. Current examples of Member Firms 200 can include entities such as Morgan Stanley of New York, N.Y., Wells Fargo & Co. of San Francisco, Calif., Goldman, Sachs & Co. of New York, N.Y., and the like. Moreover, shares of all participating funds which are listed and/or hosted and/or available for processing at the Exchange(s), and their fund shares, are available for purchase and redemption by all Investors 100 and all Member Firms 200. Mutual funds already having designated securities symbols, or other assigned representative symbols, qualify such funds to be Exchange Listed/hosted/processed Funds (ELF). Investor 100 can purchase and redeem ELF shares of all participating funds through their Member Firms 200, similar to placing an equity securities (e.g., stock trade, and pay a traditional commission (e.g., a stock commission) or other fees for broker services (e.g., asset based fees). Funds and their advisers/distributors can pay the Exchange and/or any other entity set up for this purpose a listing fee, an annual asset-based fee based on ELF share assets outstanding, and/or transaction fees. Further, an Investor 100 can pay a lower fee (e.g., such as a regular stock trade 'commission') per order to a Member Firm 200 for ELF share purchases and/or redemptions than they now pay in either 'transaction fees' to purchase 'no load' funds or 'no load' fund "trails," or sales 'loads' to purchase 'load' funds.

With reference to FIG. 1, an Investor 100 wishing to purchase or redeem ELF shares communicates with a Member Firm 200 in any of a number of ways via a communications channel 900, including using a telephone, facsimile, personal computer over a Wide Area Network (WAN) such as the Internet, wireless or other type of input device, or otherwise in person. The communication channel(s) 900 can be any one or combination of local area network (LAN), wide area network (WAN) such as the Internet, wireless application protocol (WAP), dedicated lines, satellite or any other device, communications medium, or system for transmitting electronic data in a timely fashion. The communication channel(s) 900 is provided among Investors 100, Member Firms 200, the Exchange(s) 300, ELF System Server 400, the ELF Web Server 450, the ELF Database 500, the Fund/Securities Clearing Agent 600, the Funds/Transfer Agents 700 and/or their Distributors (not shown), and the Depository 800, as illustratively shown in FIG. 1.

Although a single Investor 100, Member Firm 200, Exchange 300, ELF System Server 400. ELF Web Server 450, ELF Database 500, Fund/Securities Clearing Agent 600, Funds/Transfer Agent 700 and Depository 800 are shown, it is understood that any number of Investors, Member Firms, Exchanges, ELF Systems Servers, ELF Web Servers, ELF Databases, Fund/Securities Clearing Agents, Funds/Transfer Agents and Depositories can form a part of system 1 in accordance with the present invention.

The Investor 100 device, if any, although not illustrated in FIG. 1, further includes a computer system (e.g., desktop, laptop, hand-held computer device, among other well-known computer devices) having software such as an operating system (OS) and various application programs, which are stored in memory (e.g., RAM, disk drives, and the like). The software programs and routines residing in the memory are executable by one or more processing units (e.g., central processing unit (CPU) or micro-processor) in a well-known manner. The Investor 100 device further includes hardware (not shown) such as a modem, a Local Area Network (LAN) adapter, among other well-known I/O devices and support hardware for executing a data communication (e.g., transferring information) with the Member Firm 200 computer system if necessary.

The Member Firm 200 uses at least one computer including a data entry device or other electronic communications device capable of electronically linking with the Investor 100, or associated broker thereof, if necessary, to process ELF share orders and create and log the Investors' 100 orders into the Member Firm's 200 computer. The data entry device includes but is not limited to a keyboard, voice, bar code scanner, among other input/output (I/O) devices. The Member Firm's 200 at least one computer includes pre-existing customer order management and trading systems that comprise a database of customer orders and related trade information. Member Firm's 200 computer(s) further includes interface systems (e.g. I/O devices), memory and at least one processor for storing and executing programs, not shown, that support communications with and among Investor 100, Exchange 300, ELF system Server 400, ELF Web Server 450, ELF Database 500, Fund/Securities Clearing Agent 600, Funds/Transfer Agents 700 and Depository 800 via communication channels 900, which may comprise separate channels between the various listed participants.

Member Firm's 200 pre-existing computer system electronically transmits ELF orders to the designated Exchange 300, via communication channel 900. The designated Exchange 300 forwards the ELF orders to the ELF System Server 400 via communication channel 900. The ELF System Server 400 can store order related information on ELF Database 500, which can be accessed through connection to ELF Web Server 450 by providing proper authorization. Although the ELF System Server 400 is shown as being located locally on the premises of an Exchange(s) 300, a person of ordinary skill in the art will appreciate that it can be located at a remote location(s), under the control of the Exchange(s) 300 and/or any other entity dedicated for this purpose.

The ELF System Server 400 receives order information from Member Firm 200, by Fund, type of order, number of shares or dollar amount of order and time and day of entry, etc. The ELF System Server 400 processes and transmits order information to the ELF Database 500, updates same, and allows access by ELF Web Server 450. Member Firm 200 and Funds/Transfer Agents 700 (and other approved ELF System Participants) can identify and follow their ELF orders and related information through password protected inquiries, via the ELF Web Server 450. The ELF Web Server 450 can publish ELF market information such as ELF's NAV, intra-day order volume, any NAV changes reported and other information periodically and/or in real-time, or summarized, over a network such as the Internet or other communications reporting systems, for public access, in addition to password protected access by designated Participants. The Exchange 300 processing system also gives Member Firm 200 access to ELF order status via the customer services facilities currently employed by the Exchange(s) 300 for traditional Securities Exchange 300 traded securities.

It is understood that an Exchange(s) can allow broker/dealers or other entities, other than Member Firms 200 (not shown in FIG. 1) such as clearing brokers to act as ordering intermediaries to be responsible for the capital commitment, and legal and operational requirements which effect securities transactions (e.g., transactions in ELF shares, as well as other securities) on behalf of their correspondent firms.

Referring to FIG. 6, a Priority of Business Rules table is illustratively shown. The table is a data component stored in memory and accessible by at least one of many computer routines (e.g., methods 2 and 3 of FIGS. 2A-2C) run by ELF System Server 400. Such computer routine utilizing such table can determine when, and what amount of ELF orders per fund and per individual Member Firm 200 will be processed through to Fund/Securities Clearing Agent 600.

The example as currently depicted in FIG. 6 is for illustrative purposes only. The ELF orders for the illustrative fund ABCDX and the Member Firm MF123 are processed according to a predetermined priority order established to satisfy the Business Rules provided. That is, the ELF orders are aggregated by netting the orders by fund and by each Member Firm according to the prioritized business rules, such aggregation which is implemented to lower ordering processing costs by minimizing the individual number of orders to be processed, as well as maximizing computer processing capabilities.

As illustratively shown in the priority Table of FIG. 6, orders can be processed in a priority order of (#1) when new purchase or redemption orders of a predetermine amount (e.g., at least $100,000) are received, (#2) when a predetermined number of orders (e.g., at least 1,000 orders) are received, (#3) when gross purchase and redemption orders of a predetermined amount (e.g., at least $150,000) are received, (#4) when gross purchase and redemption orders of a predetermined number of shares (e.g., at least 10,000 shares) are received, (#5) at a predetermined time interval (e.g., every 30 minutes), (#6) when gross orders to purchase or redeem a predetermined amount of shares (e.g., at least 10,000 shares) are received, and (#7) at end of day (which is preferably the default Business Rule). The type, conditions and priority order of the business rules of FIG. 6 is not considered limiting, as other business rules and priority orders are contemplated. The priority order of the business rules are established to lower ELF ordering processing costs by minimizing the number of orders to be processed, and to maximize computer processing operations.

The ELF System Server 400 can include several processors (not shown) coupled together, as well as memory (volatile and/or non-volatile memory structures) for storing operational and application programs. The ELF System Server 400 electronically aggregates orders in accordance with the Business Rules, as required, per each Member Firm 200 and by other criteria, reformats the ELF standard Exchange Equity Order Entry information (FIG. 3.) into the Fund Order Entry Format (see FIG. 4.), and transmits that order information to the Fund/Securities Clearing Agent 600, in real-time (continuous), single, batch, or multi-batch, periodically throughout the day, or at the end of the day for execution, confirmation, and clearing, once or more per day, and settlement, at NAV, or continuously at clearing price. Moreover, the ELF System Server 400 and ELF Database 500, via the ELF Web Server 450, provides Member Firms 200 with access to real-time and/or summarized information related to the submitted orders.

The Fund/Securities Clearing Agent 600 electronically forwards, individual, or aggregated ELF orders to individual Funds/Transfer Agents 700 via communication channel 900 for processing, confirmation, clearing and settlement, which includes fund share issuance and redemption of shares by mutual fund issuers.

Funds/Transfer Agents 700 transmit electronic payments of cash dividends and/or dividend reinvestment (consisting of income, capital gains and/or return of capital) payable by Funds/Transfer Agents 700 (e.g., Fund-I through Fund-N of FIG. 1), via communication channel 900 to the appropriate Member Firm's Fund/Securities Clearing Agent 600 account via the Fund/Securities Clearing Agent 600. The dividend information from each Fund (e.g., Fund-1, Fund-2, and so forth) can also be routed to the ELF System Server 400 by Funds/Transfer Agents 700, or by a fund NAV reporting agent (e.g., Nasdaq), for tabulation of ELF information, including, but not limited to dividends paid, correct calculation of each fund's NAV, calculation of ELF total returns and ELF assets, etc., held at each Member Firm 200.

An additional method for distribution of cash dividends and transfer of registered ELF shares as dividends is through Funds/Transfer Agents 700 and Depository 800. In particular, ELFs can be designated Depository 800 Eligible Securities (e.g., currently designated by DTCC). A bridge communications channel 900 link can be created between Depository 800 and the Funds/Transfer Agent 700 can accommodate transfers of ELF shares, and cash dividends payable by Funds/Transfer Agents 700 can be transferred to the Fund/Securities Clearing Agent 600 for distribution and confirmation to Member Firms 200 holding ELF shares.

Referring to FIGS. 2A through 2E, a description of the preferred embodiment for practicing methods 2-4 of the present invention illustratively using the System 1 of FIG. 1 is shown. In particular, in the embodiment shown, ELF shares are purchased or redeemed (via Member Firm 200, Exchange 300, ELF System Server 400, Fund/Securities Clearing Agent 600) directly from/to the Fund/Transfer Agent 700, after calculation of NAV at end of day or periodically, and can also be processed continuously, similar to how stock, closed-end funds and ETFs are "traded" today. In this parallel, integrated system of end of day and periodic NAV processing of ELF shares and continuous daily processing of ELF Shares, the ELF symbol is preferably a fund's currently assigned five character symbol ending in suffix "X," or is an assigned symbol.

Figure 2A:
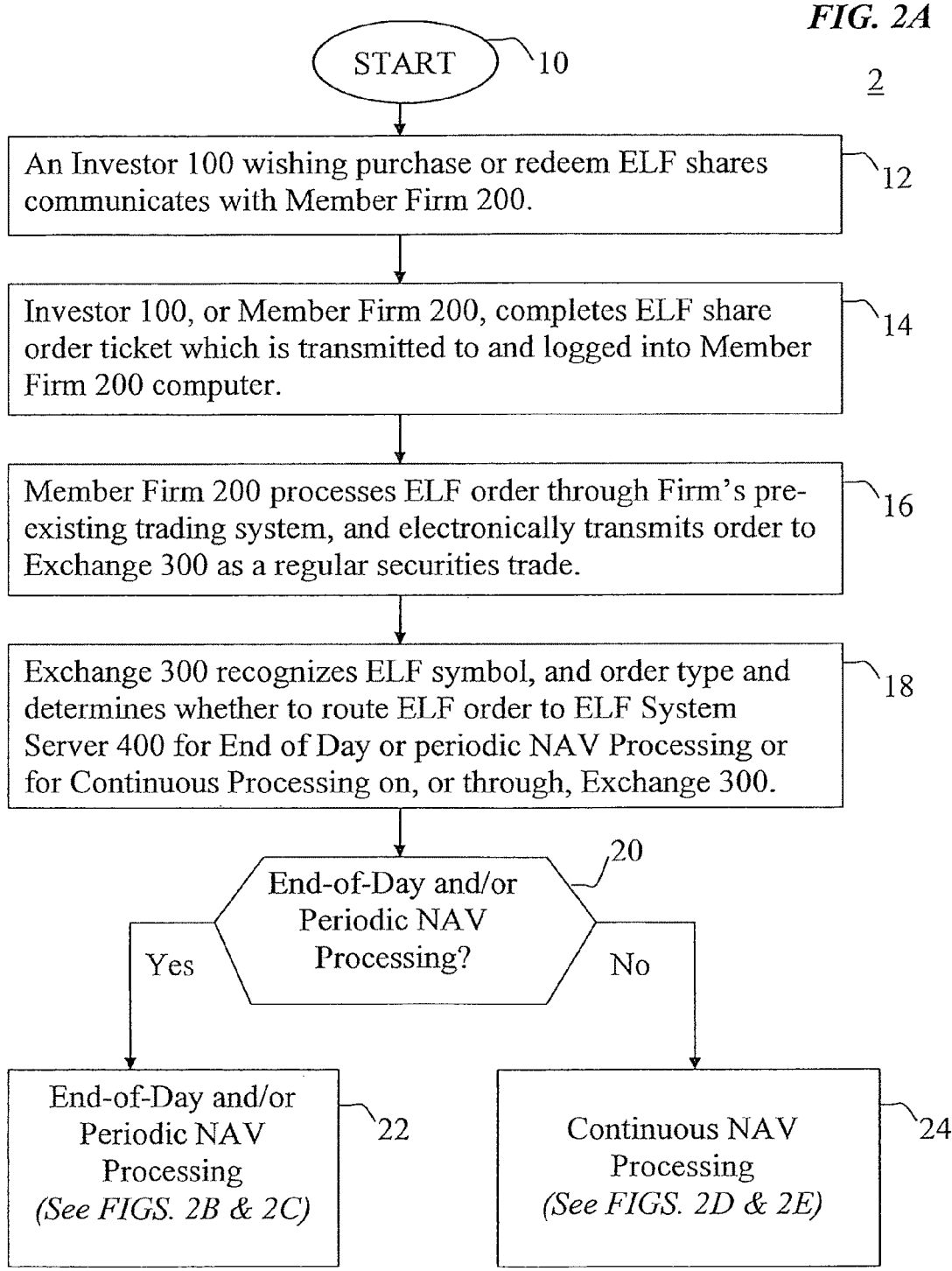
FIG. 2A is a flow diagram of a method for processing ELF purchase and redemption orders using the system of FIG. 1.

With reference to FIG. 2A, method 2 starts at step 10 and proceeds to step 12, where an Investor 100 wishing to purchase (buy) or redeem (sell) ELF shares communicates with the Member Firm 200 to place an order for or redeem a specified dollar or share amount of a specific fund.

At step 14, the Investor 100 (or Member Firm 200) completes an order for ELF shares using a data entry device, or via electronic communications link, or Investor 100 communicates order information to Member Firm 200 in another well-known manner, to create and input the Investor's 100 order into the Member Firm's 200 computer device. The Investor 100 places the order as he or she would traditionally place orders for Securities Exchange listed securities, e.g., specifying an ELF security symbol, currently five (5) characters ending with the suffix 'X', or another designated symbol, the number of shares (or dollar amount if supported by Member Firm 200 order entry system), limit price (if applicable), type of order (e.g. good until cancelled, good through the day of entry, opening only, immediate or cancelled, good until executed, etc.) and other information that can be requested or required by Member Firm 200 and Exchange 300 for ELF order processing.

At step 16, the Member Firm 200 uses the firm's pre-existing securities and order management system to process the order. The Firm's pre-existing securities order management system formats the data of such order(s) according to the requirements of the then current communications facility and/or routing systems which electronically link, and provides communications channels 900 and means by which the Member Firms 200 can transmit and receive securities order information to and from the designated Exchange(s) 300 on which the ELF shares are listed, hosted and/or otherwise processed. A prior art example of a standard Exchange Equity Order Entry Format suitable for placing orders for securities is illustratively shown in FIG. 3.

The Member Firm's 200 existing securities order management system then electronically transmits ELF share purchase or redemption orders as regular securities trades, with assigned symbols, via the communication channels 900 to the designated Exchange(s) 300, as they would a traditional equity securities order, or by such other means as are operationally expedient and efficient. For example, if the Member Firm 200 has aggregation capabilities, in one embodiment, it can transmit (route) only aggregated orders to the designated Exchange 300. Alternatively, the Member Firm 200 can transmit the individual orders, such as those provided by the Exchange Equity Order Entry Format of FIG. 3.

At step 18, the designated Exchange's 300 order processing system identifies the order(s) as an ELF order(s) based on the ELF symbols (e.g., the current five (5) character symbol inclusive of the 'X' appended thereto, or by an ELF fund symbol look-up table). At step 20, a determination is made whether to route such orders to the ELF end of day and/or periodic NAV processing system, or to the ELF continuous processing system. If the orders are to be routed to the ELF end of day and/or periodic NAV processing system, the method 2 proceeds to step 22. Alternatively, if the orders are to be routed to the ELF continuous processing system, the method 2 proceeds to step 24.

Figure 2C:
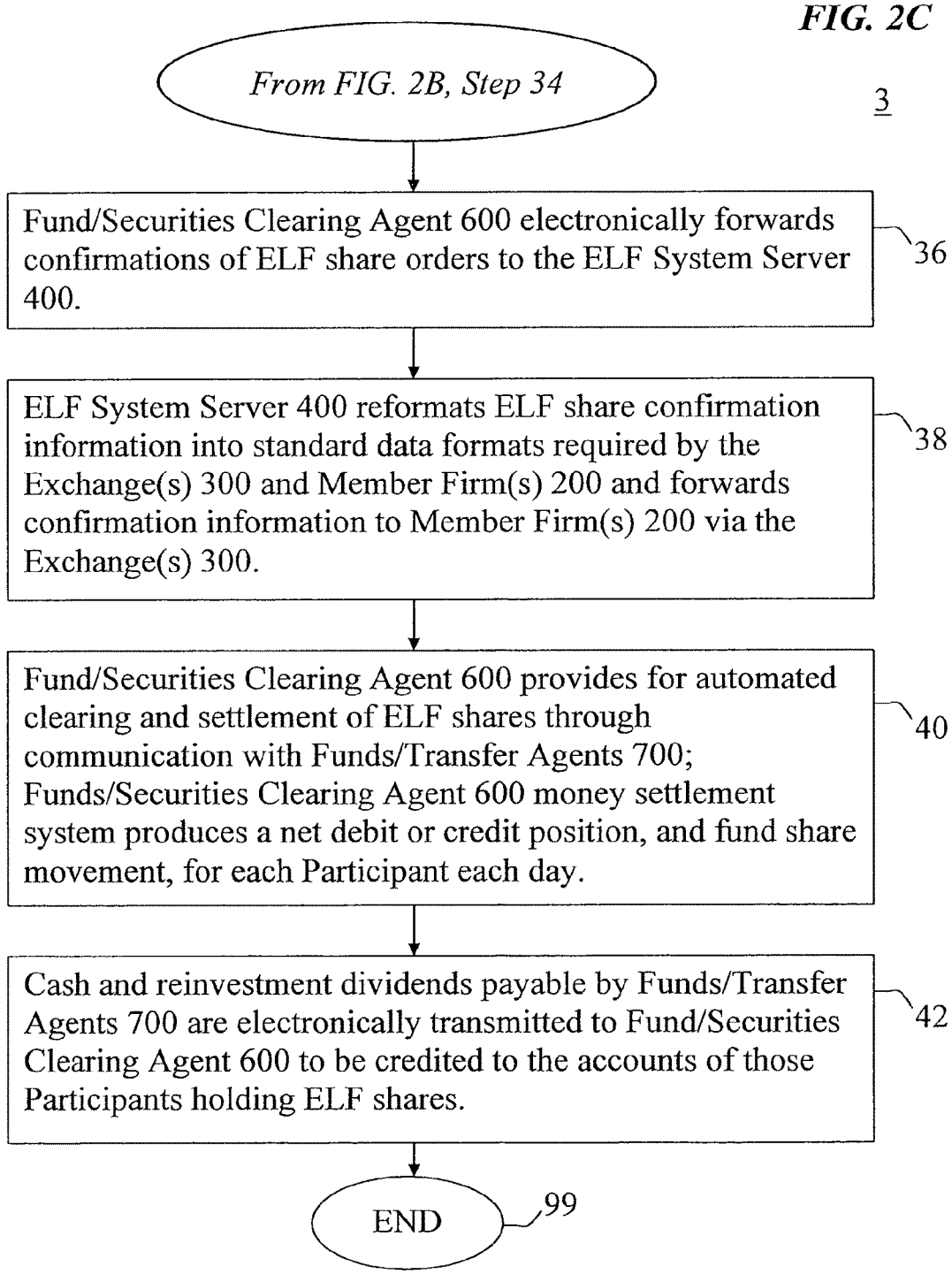

At step 22, ELF orders for end of day and/or periodic NAV processing are routed to the ELF System Server 400 as described with respect to method 3 of FIGS. 2B and 2C. At step 24, ELF orders for continuous processing remain within the Exchange market for matching and execution as described with respect to method 4 of FIGS. 2D and 2E and, if applicable, are later routed from Exchange 300 to ELF System Server 400 for end of day or periodic NAV processing.

Referring to FIGS. 2B and 2C, method 3 is described for providing end of day and periodic NAV processing using system 1 in FIG. 1. At step 26 of FIG. 2B, ELF System Server 400 receives all ELF orders for end of day and/or periodic NAV processing from the Exchange 300, periodically (if applicable), or at the end of the day. At step 28, the ELF System Server 400 records ELF orders from Exchange 300 (step 26) into ELF Database 500, and receives and records additional ELF purchase and redemption orders from Exchange 300 (FIG. 2D, step 50) for end-of-day or periodic (if applicable) NAV processing. The ELF System Server 400 processes any updates or actions against such related orders in the ELF Database 500. The ELF System Server 400 includes programming to create a duplicate copy of the information received in the designated standard Exchange Equity Order Entry Format (FIG. 3). The ELF System Server 400 stores current, historical, and other information pertaining to, and totals of, ELF purchase and redemption orders by Member Firm 200 and by Fund, by date, including but not limited to gross purchase and redemption orders and net Fund positions, including dividends paid, of each ELF Fund by Member Firm 200, in the ELF Database 500. The ELF System Server 400 includes software programs to perform calculations, sorting and tabulation of records and creation of reports based upon data to be transmitted to, and/or received from, ELF Database 500 through communications interface with ELF System Server 400.

At step 29 the ELF System Server 400 aggregates purchase and redemption orders according to business rules, such as those provided in the table of FIG. 6. The type and priority order of the business rules of FIG. 6 is not considered limiting, as other business rules and priority orders are contemplated. The priority order of the business rules are established to lower ELF ordering processing costs by minimizing the number of orders to be processed and maximizing computer processing operations.

At step 30, the ELF System Server 400 reformats the ELF order information received from Member Firm 200 in standard Exchange Equity Order Entry Format into the data formats required by the Fund Order Entry Form (e.g., partial view of Fund/SERV Order Entry Form shown in FIGS. 4A and 4B), and such reformatted order information is electronically forwarded to the Fund/Securities Clearing Agent 600 in real-time, single, batch, or multi-batch, periodically, throughout the day, or at the end of the day, through established electronic communication channel 900 for processing.

At step 32, the Fund/Securities Clearing Agent 600 electronically processes and forwards individual or aggregated ELF orders to individual Funds/Transfer Agents 700 for further processing and confirmation, which includes fund share issuance and redemption of shares by the mutual fund, along communication channel 900 established between the Fund/Securities Clearing Agents 600 and the Funds/Transfer Agents 700, in accordance with the Fund/Securities Clearing Agent's 600 policies and procedures, and as described below with respect to step 40 of FIG. 2C.

At step 34, Funds/Transfer Agents 700 send electronic ELF share confirmations to the Fund/Securities Clearing Agent 600, along communication channel 900 established between the Funds/Transfer Agents 700 and the Fund/Securities Clearing Agent 600 in accordance with the Fund/Securities Clearing Agent's 600 policies and procedures.

Referring to FIG. 2C, at step 36, the Fund/Securities Clearing Agent 600 electronically sends confirmation of Member Firms' 200 ELF share orders back to the ELF System Server 400 periodically, and/or at the end of the day, according to the Fund/Securities Clearing Agent 600 policies and procedures. Such information travels along communication channel 900 established between the Fund/Securities Clearing Agent 600 and the ELF System Server 400.

At step 38, the ELF System Server 400 reformats the ELF share order confirmation information received from the Fund/Securities Clearing Agent 600 back into the standard data formats required by the Exchange 300 and Member Firm 200 communications protocols and electronically forwards such order confirmations to ordering Member Firm(s) 200 through the Exchange(s) 300, in real-time, or delayed, through communication channels 900 currently established for traditional securities trade confirmation purposes.

At step 40, the Fund/Securities Clearing Agent 600 provides for automated clearing and settlement of confirmed purchases and redemptions of ELF shares with Funds/Transfer Agents 700; money settlement through money settlement system (e.g., NSCC's Daily Money Settlement System), in consolidation with other Fund/Securities Clearing Agent 600 Participant settlements to produce a net debit or credit position for each participant every business day; and corresponding ELF share issuance and redemptions via Fund/Securities Clearing Agent 600 and Funds/Transfer Agents 700.

At steps 42, cash dividends and/or dividend reinvestment (consisting of income and/or capital gains and/or return of capital) payable by Funds are remitted through electronic payments and transfers by Funds/Transfer Agents 700 to the appropriate Member Firm's Fund/Securities Clearing Agent 600 accounts, such dividend information also being routed to the ELF System Server 400, or to be received from Fund NAV reporting agent (e.g., Nasdaq) for tabulation of ELF information, including, but not limited to correct calculation of each fund's NAV, calculation of ELF total returns and ELF assets held at each Member Firm 200. The method 3 then proceeds to step 99, where the method 3 ends.

Figure 2D:
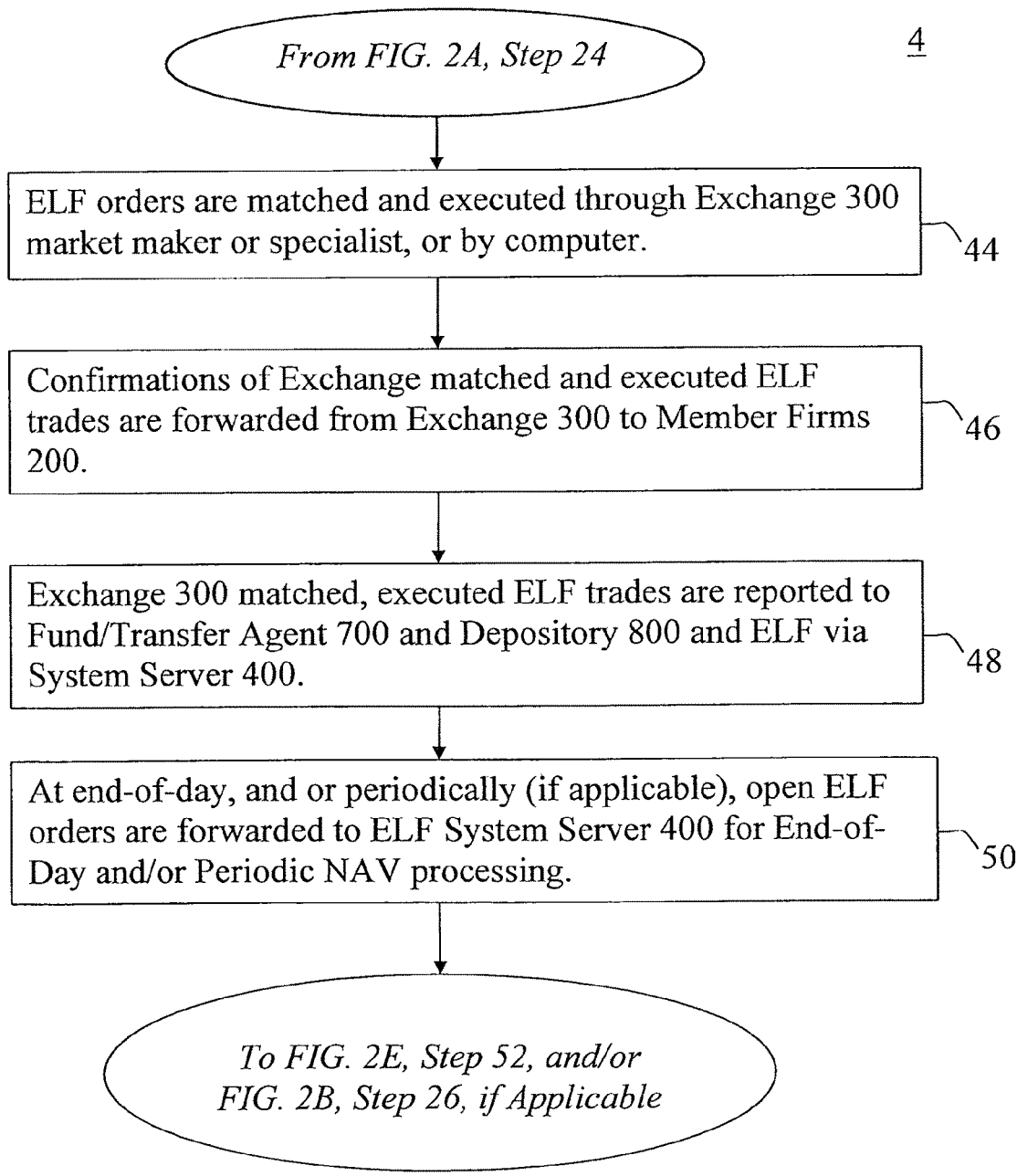
FIGS. 2D and 2E is a flow diagram a method for continuous processing of ELF purchase and redemption orders using the system of FIG. 1.
Figure 2E:
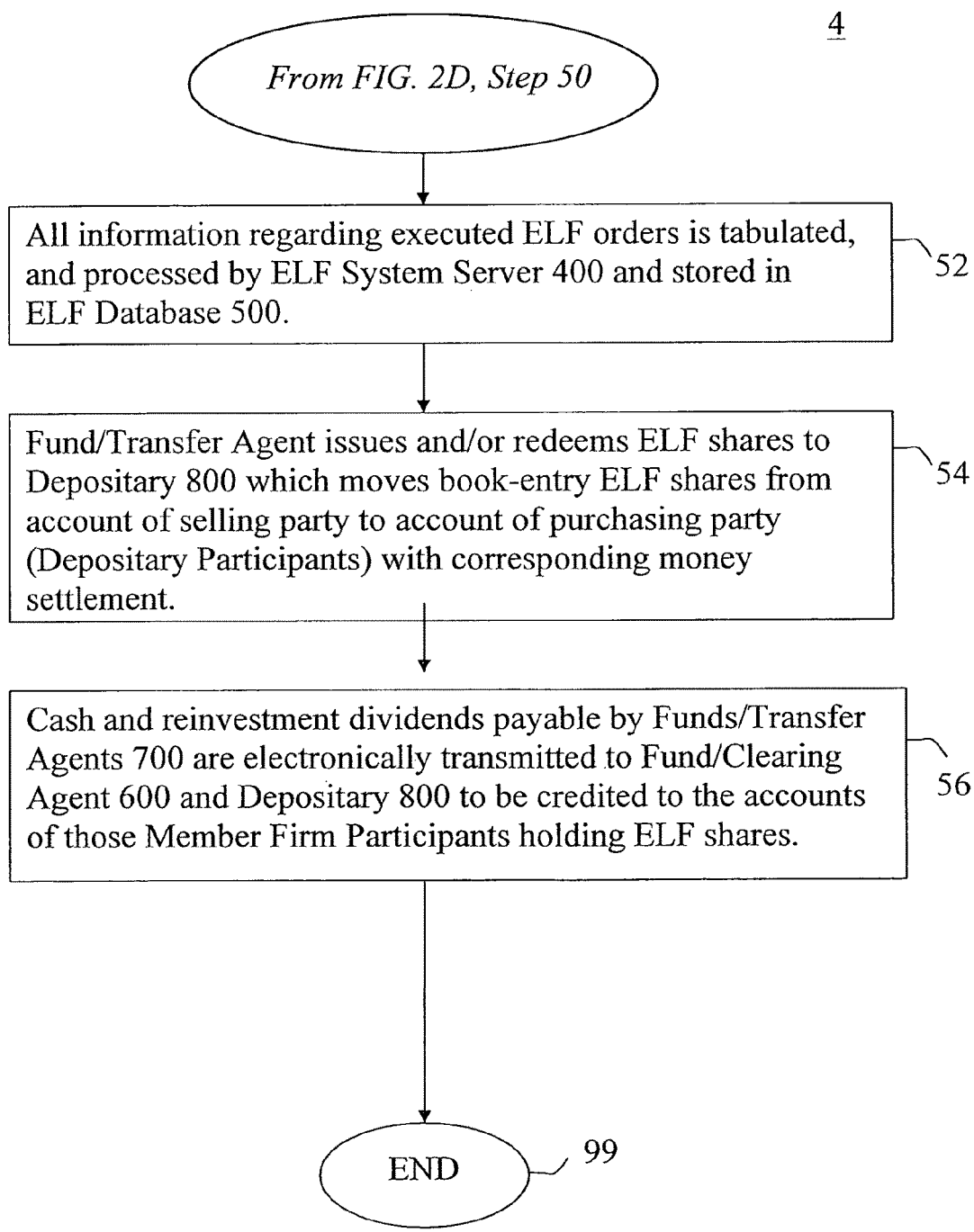
Figure 5A:
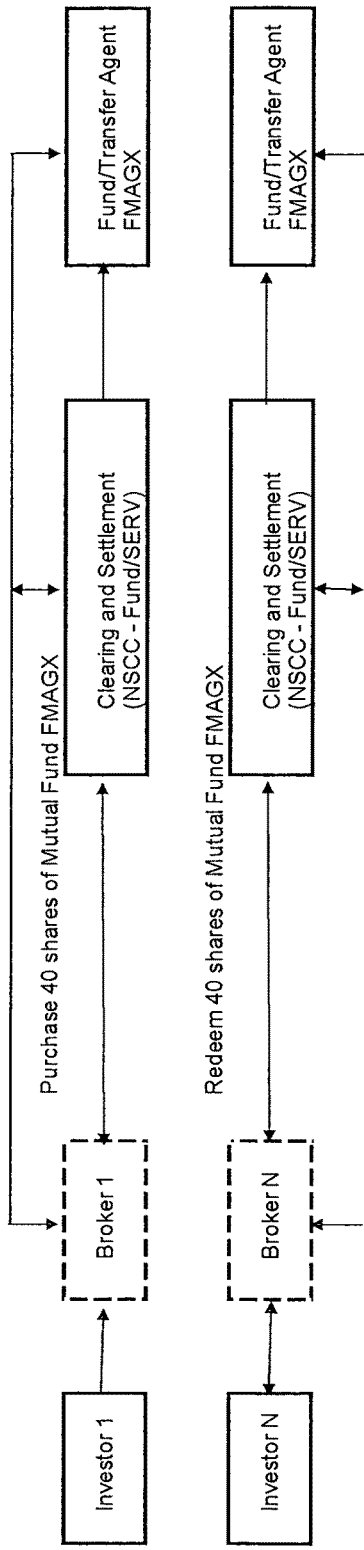

Referring to FIGS. 2A, 2D and 2E, a method 4 for providing Continuous Processing illustratively using system 1 of FIG. 1 is described. The method 4 begins at step 24 of FIG. 2A, and proceeds to step 44 of FIG. 2D. At step 44, ELF orders for Continuous Processing can be matched and executed through an Exchange market maker, specialist or computer, which would have both sides (purchase and redemption) of an order, either as a principal or representing one or more Member Firms 200.

At step 46, once the order is executed as a partial or fully matched trade, the confirmation information is electronically reported to the Member Firm 200, in real-time, single batch or multi-batch, or continuously throughout the day through communication channel 900 currently established for such purposes.

At step 48, matched and executed ELF orders are reported to the Funds/Transfer Agent 700 and Depositary 800 by the Exchange 300. The matched and executed ELF orders can be reported in real-time, single batch, multi-batch or continuously throughout the day through communications channel 900 currently established for Securities Exchange trade confirmation, clearing and settlement purposes, and to the ELF System Server 400.

At step 50, at the end of the day, and/or periodically (if applicable), open ELF orders are forwarded to ELF System Server 400 by the Exchange 300 for NAV processing (to step 26 of FIG. 2B). Referring to FIG. 2E, at step 52, all information regarding the executed ELF orders is tabulated and processed by the ELF System Server 400 and stored in ELF Database 500.

At step 54, the Funds/Transfer Agent 700 issues and/or redeems ELF shares registered as book-entry shares in street name by the fund for Depository 800 Participants, and Depositary 800 provides for movement of confirmed ELF share purchases and redemptions (related money settlement currently through NSCC's Continuous Net Settlement System (CNS) and NSCC's Daily Money Settlement System) in consolidation with other Fund/Transfer Agent 700 and Depositary 800 transactions to produce a net debit or credit position for each Participant every business day.

At step 56, cash dividends and/or dividend reinvestments payable by Funds/Transfer Agents 700 (consisting of income and/or capital gains and/or return of capital) are remitted through electronic payments and transfers by the Funds/Transfer Agent 700 to the appropriate Member Firm's Fund/Securities Clearing Agent 600 or Depository 800 Participant accounts, such dividend information also being transmitted to the ELF System Server 400, or to be received from fund NAV calculation agent (e.g., Nasdaq) for tabulation of ELF information, including, but not limited to correct calculation of each fund's NAV, calculation of ELF total returns and ELF assets held at each Member Firm 200. The method 4 then proceeds to step 99, where method 4 ends.

As shown in FIG. 1, the system 1 includes a plurality of computer devices that are suitable for performing and controlling operations at each of the operation centers 100, 200, 300, 400, 450, 500, 600, 700 and 800 and therebetween. Each computer device comprises at least one processor as well as memory for storing various control programs. The processor can be any conventional processor, such as one or more Intel Processors. The memory can comprise volatile memory (e.g., RAM), non-volatile memory (e.g., disk drives) and/or a combination thereof. The processor(s) cooperates with support circuitry, such as power supplies, clock circuits, cache memory, among other conventional support circuitry, to assist in executing software routines (e.g., methods 2-4) stored in the memory.

As such, it is contemplated that some of the process steps discussed herein as software processes can be implemented within hardware, for example, as circuitry that cooperates with the processor(s) to perform various steps. It is noted that an operating system (not shown) and various application programs (not shown) are stored in the memory to run specific tasks and enable user interaction. The computer devices also include input/output (I/O) circuitry that forms an interface between various functional elements communicating with the computer devices. For example, as shown in FIG. 1, the computer devices at each operations center (100-800) can communicate with the devices associated with each other via signal paths 900.

Although the computer devices described with respect to the system 1 of FIG. 1 are depicted as general-purpose computers that are programmed to perform defined functions for specific purposes in accordance with the methods and routines of the present invention, the invention can be implemented in hardware such as, for example, an application specific integrated circuit (ASIC). As such, it is intended that the processes described herein be broadly interpreted as being equivalently performed by software, hardware, or a combination thereof.

Having now described a few embodiments of the invention, it should be apparent to those skilled in the art that the foregoing is merely illustrative and not limiting, having been presented by way of example only. Numerous modifications and other embodiments, including combinations of features found in the illustrated embodiments, are within the scope of one of ordinary skill in the art and are contemplated as falling within the scope of the invention as defined by the claims.

I claim:

1. A computer implemented method for processing traditional open-end mutual fund order messages including purchase and redemption orders of shares of an open-end mutual fund, the open-end mutual fund being continuously listed or hosted by a securities Exchange for processing the purchase and redemption orders, and the open-end mutual fund having a total number of currently issued shares which is variable as a function of periodic adjustments for newly purchased shares and redeemed shares, the method comprising the steps of:

receiving, at one or more first servers associated with the securities Exchange, order messages associated with purchase and/or redemption orders for shares of the open-end mutual fund, the mutual fund being continuously listed or hosted at the Exchange, the order messages being sent from one or more Member Firms of the securities Exchange, and the securities Exchange being a financial market that includes listed securities with a finite number of shares and lists the open-end mutual fund having a total number of currently issued shares which is variable as a function of periodic adjustments for newly purchased shares and redeemed shares;

processing at the one or more first servers, per Member Firm, the received purchase and redemption order messages for the open-end mutual fund shares as individual orders or as an aggregation of multiple orders, wherein said processing includes storing the received order messages in a first format, applying predetermined business rules to underlying orders associated with the order messages, and formatting the order messages to a second format; and transmitting the processed orders from the one or more first servers to at least one of a plurality of second servers at Fund/Securities Clearing Agents for confirmation, clearing and settlement including issuance and redemption of the open-end mutual fund shares by the open-end mutual fund, wherein the total number of currently issued shares of the open-end mutual fund is variable as a function of the periodic adjustments for the newly purchased shares and redeemed shares upon clearance and settlement of the processed orders.

2. The computer implemented method of claim 1, wherein the step of transmitting further comprises the step of forwarding the processed orders from the at least one second server to at least one third server of at least one individual Funds and Transfer Agents for processing and confirmation.

3. The computer implemented method of claim 1, wherein the step of transmitting comprises sending said processed orders periodically from the at least one first server as single, batch and/or multi-batch messages.

4. The computer implemented method of claim 1, wherein the step of transmitting comprises sending said processed orders throughout the business day from the at least one first server as single, batch and/or multi-batch order messages.

5. The computer implemented method of claim 1, wherein the step of processing the underlying orders includes applying a set of business rules to the orders.

6. The computer method of claim 5, wherein the applying a set of business rules comprises processing orders per fund per Member Firm based when new purchase or redemption orders of a predetermined amount are received, and processing orders when a predetermined number of orders are received.

7. The computer implemented method of claim 5, wherein the applying a set of business rules further comprises processing orders per fund per Member Firm based on when gross purchase and redemption orders of a predetermined amount are received, and processing orders when gross purchase and redemption orders of a predetermined number of shares are received.

8. The computer implemented method of claim 5, wherein the applying a set of business rules further comprises processing orders per fund per Member Firm based on a predetermined time interval, processing orders when gross orders to purchase or redeem a predetermined amount of shares are received, and processing orders at periodic time intervals and/or at end of day.

9. The computer implemented method of claim 5, further comprising the step of prioritizing the set of business rules.

10. The computer implemented method of claim 1 further comprising reformatting the individual or aggregated orders from a first format to a second format at the one or more first servers prior to transmitting the orders to the at least one of a plurality of second servers at Fund/Securities Clearing Agents.

11. A computer implemented system for processing traditional open-end mutual fund order messages at a designated securities Exchange, including purchase and redemption orders of shares of an open-end mutual fund, the open-end mutual fund being continuously listed or hosted at the Exchange for processing, the open-end mutual fund having a total number of currently issued shares which is variable as a function of periodic adjustments for newly purchased shares and redeemed shares, the system comprising:
    at least one first server communicably coupled to and associated with the Exchange, the at least one first server being configured to:
    receive, from Member Finns of the securities Exchange, order messages associated with purchase and/or redemption orders for open-end mutual fund shares which are continuously listed or hosted at the Exchange, the securities Exchange being a financial market that includes listed securities with a finite number of shares and lists the open-end mutual fund having a total number of currently issued shares which is variable as a function of periodic adjustments for newly purchased shares and redeemed shares;
    process at the at least one first server, per Member Firm, the received purchase and/or redemption order messages for the open-end mutual fund shares as individual orders or as an aggregation of multiple orders, wherein said process includes storing the received order messages in a first format, applying predetermined business rules to underlying orders associated with the order messages, and formatting the order messages to a second format; and
    transmit the processed orders from the at least one first server to at least one of a plurality of second servers at Fund/Securities Clearing Agents for confirmation, clearing and settlement including issuance and redemption of the open-end mutual fund shares by the open-end mutual fund, wherein the total number of currently issued shares of the open-end mutual fund is variable as a function of the periodic adjustments for the newly purchased shares and redeemed shares upon clearance and settlement of the processed orders.

12. A computer implemented method for continuously processing traditional open-end mutual fund order messages associated with purchase and redemption orders of a plurality of open-end mutual funds listed at a securities Exchange, each said open-end mutual fund having a total number of currently issued shares which is variable as a function of periodic adjustments for newly purchased shares and redeemed shares; the method comprising the steps of:
    receiving purchase and redemption orders at a first server of the securities Exchange from a second server of at least one Member Firm of the securities Exchange, the securities Exchange being a financial market that includes listed securities with a finite number of shares and lists or hosts the open-end mutual fund having a total number of currently issued shares which is variable as a function of periodic adjustments for newly purchased shares and redeemed shares;
    aggregating, which includes matching orders for each open-end mutual fund per Member Firm at the first server of the Exchange, each said open-end mutual fund being continuously listed or hosted on the Exchange;
    transmitting orders to servers of at least one of a plurality of Fund/Securities Clearing Agents, Funds/Transfer Agents and Depositaries for clearing and settlement;
    receiving executed orders from at least one of a plurality of Fund/Securities Clearing Agents, Funds/Transfer Agents and Depositaries for clearing and settlement;
    disaggregating the executed orders at the first server of the Exchange; and
    transmitting the disaggregated and other executed orders from the first server of the Exchange to the second server of the at least one Member Firm for confirmation, wherein the total number of currently issued shares of the open-end mutual fund is variable as a function of the periodic adjustments for the newly purchased shares and redeemed shares upon clearance and settlement of the processed orders.

13. The computer implemented method of claim 12, wherein the step of transmitting the aggregated orders from the first server comprises forwarding the orders continuously in real-time to servers of the at least one of a plurality of Fund/Securities Clearing Agents, Funds/Transfer Agents and Depositaries.

14. The computer implemented method of claim 12, further comprising the step of tabulating the aggregated and executed orders.

15. The computer implemented system of claim 11, wherein the at least one first server is further operable to reformat the orders to a fund order entry format prior to the transmission of the orders to the at least one of a plurality of second servers at the Fund/Securities Clearing Agents.

16. The computer implemented system of claim 1, wherein the individual or aggregated orders are sent from the at least one second server throughout the business day as single, batch and/or multi-batch order messages.

17. The computer implemented system of claim 11, wherein the individual or aggregated orders are sent periodically from the at least one first server as single, batch and/or multi-batch order messages.

18. The computer implemented system of claim 11, wherein the individual or aggregated orders are sent at the end of the business day from the at least one first server as single, batch and/or multi-batch order messages.

19. The computer implemented system of claim 11, wherein the applying predetermined business rules includes applying one or more business rules to the underlying orders.

20. The computer implemented system of claim 19, wherein the set of business rules comprises processing orders per fund per Member Firm based on when new purchase or redemption orders of a predetermined amount are received, and processing orders when a predetermined number of orders are received.

21. The computer implemented system of claim 19, wherein the set of business rules comprises processing orders per fund per Member Firm based on when gross purchase and redemption orders of a predetermined amount are received, and processing orders when gross purchase and redemption orders of a predetermined number of shares are received.

22. The computer implemented system of claim 19, wherein the set of business rules comprises processing orders per fund per Member Firm based on a predetermined time interval, processing orders when gross orders to purchase or redeem a predetermined amount of shares are received, and processing orders at periodic time intervals and/or at end of day.

23. The computer implemented system of claim 19, wherein the set of business rules determine hierarchy and timing for processing the orders.

* * * * *